United States Patent [19]
Kumar et al.

[11] Patent Number: 5,944,819
[45] Date of Patent: Aug. 31, 1999

[54] METHOD AND SYSTEM TO OPTIMIZE SOFTWARE EXECUTION BY A COMPUTER USING HARDWARE ATTRIBUTES OF THE COMPUTER

[75] Inventors: Rajendra Kumar; Alan H. Karp, both of Sunnyvale, Calif.

[73] Assignee: Hewlett-Packard Company, Palo Alto, Calif.

[21] Appl. No.: 08/018,972

[22] Filed: Feb. 18, 1993

[51] Int. Cl.⁶ ....................................................... G06F 9/06
[52] U.S. Cl. .................................................................. 713/1
[58] Field of Search ..................................... 395/700, 500, 395/712; 364/280.5; 713/1, 2, 100; 709/220, 221, 222; 710/8, 10

[56] References Cited

U.S. PATENT DOCUMENTS

| | | | |
|---|---|---|---|
| 4,858,114 | 8/1989 | Heath et al. ............................. | 364/200 |
| 5,051,745 | 9/1991 | Katz .......................................... | 341/51 |
| 5,142,469 | 8/1992 | Weisenborn ............................. | 364/146 |
| 5,193,174 | 3/1993 | Bealkowski et al. .................... | 395/500 |
| 5,212,794 | 5/1993 | Pettis et al. .............................. | 395/700 |
| 5,237,689 | 8/1993 | Behnke ..................................... | 395/700 |
| 5,257,379 | 10/1993 | Cwiakala et al. ....................... | 395/700 |
| 5,299,322 | 3/1994 | Arai et al. ................................ | 395/275 |

OTHER PUBLICATIONS

E. Anderson et al., "LAPACK Users' Guide", Society of Industrial and Applied Mathematics, Philadelphia, 1992.
Monica S. Lam et al., "The Cache Performance and Optimizations of Blocked Algorithms", pp. 63–74.
IBM VS FORTRAN Version 2 Programming Guide for CMS and MVS, Release 5, Dec. 1990.
IBM System/370 Vector Operations, Second Edition, Aug. 1986, pp. 2.1–3.39.
PKZIP Create/Update Utility Version 2.04C Dec. 28, 1992, PKZIP 204/WHATSNEW 204, PKWARE, Inc.
Microsoft Windows Resource Kit, © 1992 Microsoft Corporation.

*Primary Examiner*—Kevin A. Kriess

[57] ABSTRACT

A method and system are disclosed which allow software to communicate with a computer at run-time. The communication provided enables the software to execute at optimal speed on different computers. More particularly, software queries a computer at run-time to determine its hardware resources. Once the software knows the hardware resources available, the software optimizes its code performance in accordance therewith. Alternatively, the invention enables the software to specify the hardware resources to be used by the computer. This allows software developers to configure a computer to act as if it actually had the resources specified by the software.

8 Claims, 4 Drawing Sheets

METHOD AND SYSTEM TO OPTIMIZE SOFTWARE EXECUTION BY A COMPUTER USING HARDWARE ATTRIBUTES OF THE COMPUTER

BACKGROUND OF THE INVENTION

1. Field of the Invention

The present invention relates to a technique for optimizing performance of a software program in accordance with computer resources and, more particularly, to a method and system for dynamically optimizing execution of a portable software program on different computers.

2. Description of the Related Art

Hardware resources vary from computer to computer. As a consequence, software must be compiled for each different computer if it is to run at optimal speed on that computer.

Presently, software is generated so as to be portable between several different computers. The problem is that the software will not run at optimal speed on each of the different computers. In particular, software (even though portable) is typically compiled to run on a specific computer in accordance with the known hardware attributes of the specific computer. Alternatively, when compiling the software, a compiler may assume a general set of hardware characteristics of the class of computers for which the software is likely to be used. In the former case, the software will run at optimal speed only in the specific computer. In the latter case, the software never runs at optimal speed in any of the computers.

The problem also extends to the distribution of software. Namely, software vendors do not want to create specific versions of a software program for optimal performance on each of the many known computers likely to use the software. On the contrary, software vendors and users of programs want as few versions of a program as possible. Vendors prefer this because it reduces their inventory and support requirements. Although users appreciate the ability to port the software to different computers which they may presently or in the future own, users find the resulting inferior performance unsatisfactory.

The present invention provides a solution to this problem so that a single version of a software program can run at optimal speed in a number of different computers.

SUMMARY OF THE INVENTION

Broadly speaking, the invention enables software to communicate with a computer to obtain or set hardware attributes of a computer system.

In a first embodiment of the invention, software queries a computer at run-time to determine its hardware resources. Once the software knows the hardware resources available, the software optimizes its code performance in accordance therewith.

An important advantage of the first embodiment is that software is not only portable between different computer systems, but also executes at optimal speed on different computers. As a result, the invention enables a single version of the software to execute at its optimal speed on each of the different computers. In addition, the invention increases the life cycle of the software because it can survive hardware changes and computer system upgrades. Furthermore, a company producing software can reduce its overhead by compiling only a single version of a software program which appeals to the entire market, thus simplifying its testing, support and inventory requirements.

In a second embodiment of the invention, hardware attributes are input and then stored in a storage area of a computer system. Thereafter, the computer system executes software in accordance with the hardware attributes stored in the storage area. The advantage of the second embodiment is not in informing the computer of the hardware attributes which it desires, but in enabling software developers to configure the computer to act as if it actually had the resources identified by the hardware attributes.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–5. However, those skilled in the art will readily appreciate that the detailed description given herein with respect to these figures is for explanatory purposes as the invention extends beyond these limited embodiments.

Figure 1:
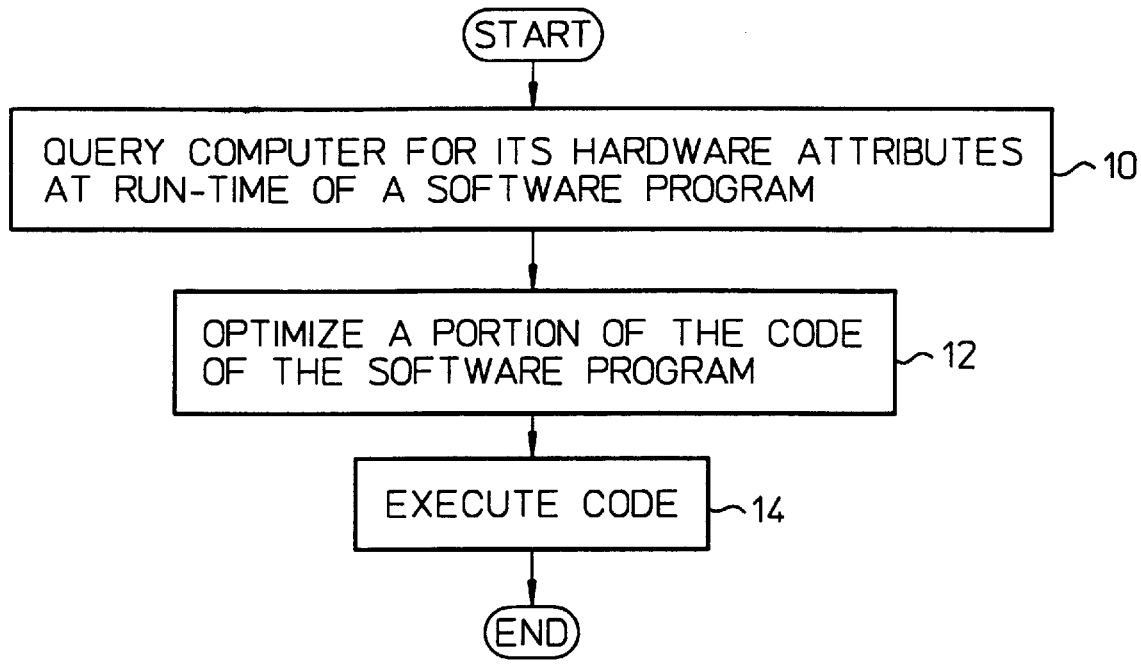
FIG. 1 is a flow chart illustrating a first embodiment of the invention.

FIG. 1 is a flow chart illustrating a method according to a first embodiment of the invention. Initially, software queries 10 a computer for its hardware attributes at run-time of the software. Once the software knows the hardware attributes of the computer, the software optimizes 12 at least a portion of the code of the software to the computer. Once optimized, the code may be executed 14 by the computer.

Hardware attributes contain information on the hardware resources available within the computer. For example, a hardware attribute may indicate the size of cache memory, the size of main memory, processor cycle time, or the number of floating point registers. Of course, numerous other hardware attributes of hardware resources may be used.

The software can optimize 12 its performance to the hardware attributes of the computer that executes the software in a number of different ways. In general, the hardware attributes are used to optimize 12 code within the software for optimal execution. For example, the software may use the hardware attributes to determine one of several algorithms contained in the software or it may simply set variables or loop limits for a general purpose algorithm within the software. In any event, the effect of the optimizing 12 is that the code of the software is configured for optimal execution in accordance with the hardware resources offered by the computer.

Typically, conventional computers do not include any means to inform the software of its hardware resources. One exception is vector operations for an IBM System/370 machine. In particular, the IBM System/370 includes a register containing a section size of a vector register for vector operations. The IBM System/370 family includes a number of models which have different section sizes (number of elements in the vector registers). At compile-time, a compiler must (if vector operations are to be performed) specify the section size of the model which will execute the program. The compiler has three options. The first option is to specify an explicit section size. The second option is to compile the program using the section size of the computer that compiles the program. In this case, the section size of the model of the computer doing the compiling can be obtained (by the compiler) by executing the instruction Store Vector Parameters. However, under either the first or second options, if the specified section size differs from the executing computer's actual section size, the program terminates upon the first processing of the routine compiled with the incompatible section size. The third option is to compile the program to execute on any of the models of the System/370, albeit, in an inefficient manner. Only the third option provides any portability of the software (i.e., only to other IBM System/370 computers) and even then the execution is inefficient on all models. For additional information on vector operations in IBM System/370 machines see "IBM System/370—Vector Operations" (Publication Number SA22-7125-1), International Business Machines Corporation 1986, and "VS Fortran Version 2 Release 5—Programming Guide for CMS and MVS" (Publication Number SC26-4222-5), Sixth Edition, International Business Machines 1990.

In any event, portable software is blind with respect to the hardware attributes of the computer which is running the software. More importantly, without knowledge of the hardware resources available for the computer actually executing the software, portable software cannot be optimized for execution on different computers.

Software typically contains many algorithms that are implemented to solve different problems. These algorithms cannot execute at optimal speed on different computers if the software has no knowledge of the hardware resources available. For example, it is well known that blocked matrix multiplication algorithms can give higher performance to computers whose cache size is not large enough to hold the entire matrix set. Blocked matrix multiplication algorithms are described in detail in Lam et al., The Cache Performance and Optimizations of Blocked Algorithms, Proceedings of the Fourth International Conference on Architectural Support for Programming Languages and Operating Systems, pp. 63–74, April 1991, which is hereby incorporated by reference. In such a case, it would be very useful to know what the optimal block size is for given computer system's cache. This requires a detailed knowledge of the structural details of the computer system's cache. Although such structural details are conventionally provided in the user manual for the computer system, they are unknown to the software. As a result, conventional techniques do not enable algorithms to run efficiently on different computer systems.

The optimization of the code can be performed using conventional optimization algorithms. For example, in the case of matrix multiplication, the block size algorithm can be optimized for the hardware attributes of the cache, thereby improving the performance of the matrix multiplication. Another example is Anderson et al., LAPACK Users' Guide, Society for Industrial and Applied Mathematics 1992, which includes various algorithms for optimizing linear algebra operations within portable software for high-performance computers, and which is hereby incorporated by reference. By providing hardware attributes to the software, the optimization algorithms within the software can be used to produce portable software which runs at optimal speed on different computers.

The optimization of the code can also be performed for various types of programs. The types of programs include, for example, general purpose application programs, dedicated application programs, utility programs, operating systems and compilers. For example, with respect to an operating system program, the code could be optimized in accordance with the hardware attributes to improve performance by determining an optimal number of tasks to run. The operating system program has internal data structures that can optimize the use of a memory hierarchy of a computer if the parameters are known. Another example is a database program (e.g., dBase) which would improve performance by keeping the least recently used data in the fastest levels of the memory hierarchy. Yet another example is a compiler program which would use the hardware attributes to improve its performance as well as the performance of the program produced by the compiler.

Figure 2:
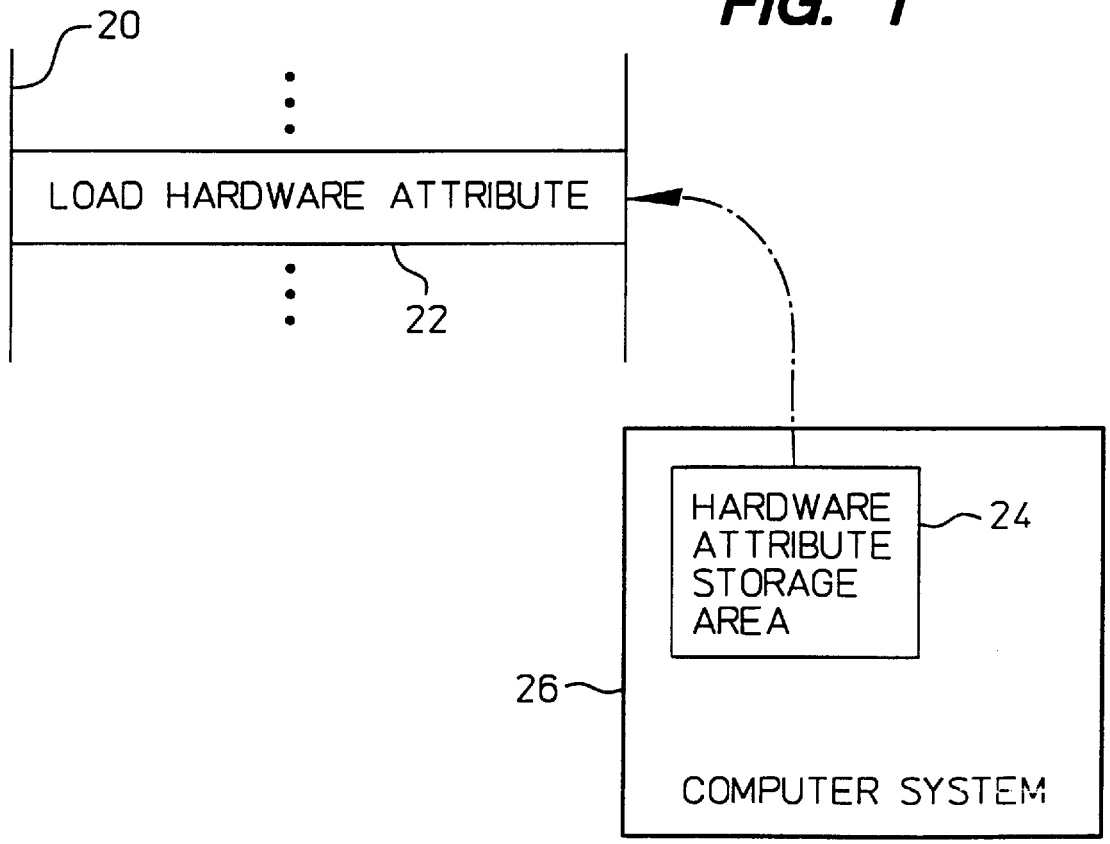
FIG. 2 is diagram illustrating a first example of the interaction between a computer program and a computer system to obtain a hardware attribute according, to the first embodiment.

FIG. 2 is a diagram illustrating a first example of the interaction between a computer program and a computer system to obtain a hardware attribute according to the first embodiment. Specifically, the hardware is queried by a program 20. In particular, a Load Hardware Attribute Instruction 22 within the program 20 when executed will request at least one hardware attribute from a hardware attribute storage area 24 within a computer system 26. The Load Hardware Attribute Instruction 22 may be contained either in the header or in the body of the program 20. However, normally the Load Hardware Attribute Instruction 22 will only need to be executed once for a given program. In sum, when the computer system 26 executes the program 20, instructions 22 in the program 20 will request certain hardware attributes (which are accessible to the software via the hardware attribute storage area 24) from the computer system 26.

Figure 3:
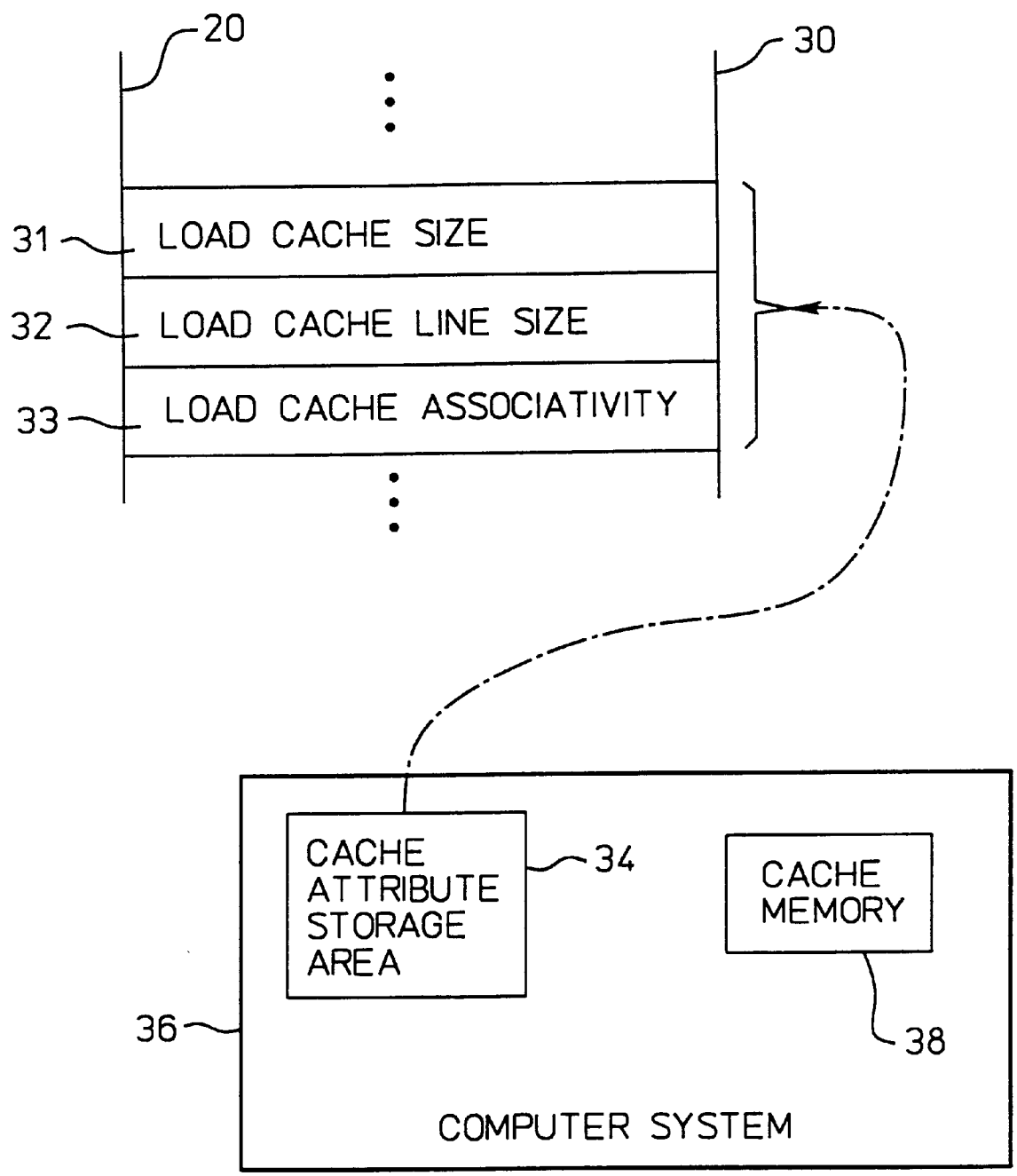
FIG. 3 is diagram illustrating a second example of the interaction between a computer program and a computer system to obtain cache attributes according to the first embodiment.

FIG. 3 is a diagram illustrating a second example of the interaction between a program and a computer system to obtain hardware attributes of a cache in accordance with the first embodiment. FIG. 3 illustrates a program header 30 which contains several instructions that query hardware resources. The instructions include a Load Cache Size Instruction 31, a Load Cache Line Size Instruction 32 and a Load Cache Associativity Instruction 33. When these instructions 31, 32 and 33 are executed, the corresponding hardware attributes of the cache are provided to the software via a cache attributes storage area 34 within a computer system 36. The cache attributes describe the hardware resources of a cache memory 38 to the software. The software can thereafter optimize its code in accordance with the hardware resources offered by the cache memory 38.

Figure 4:
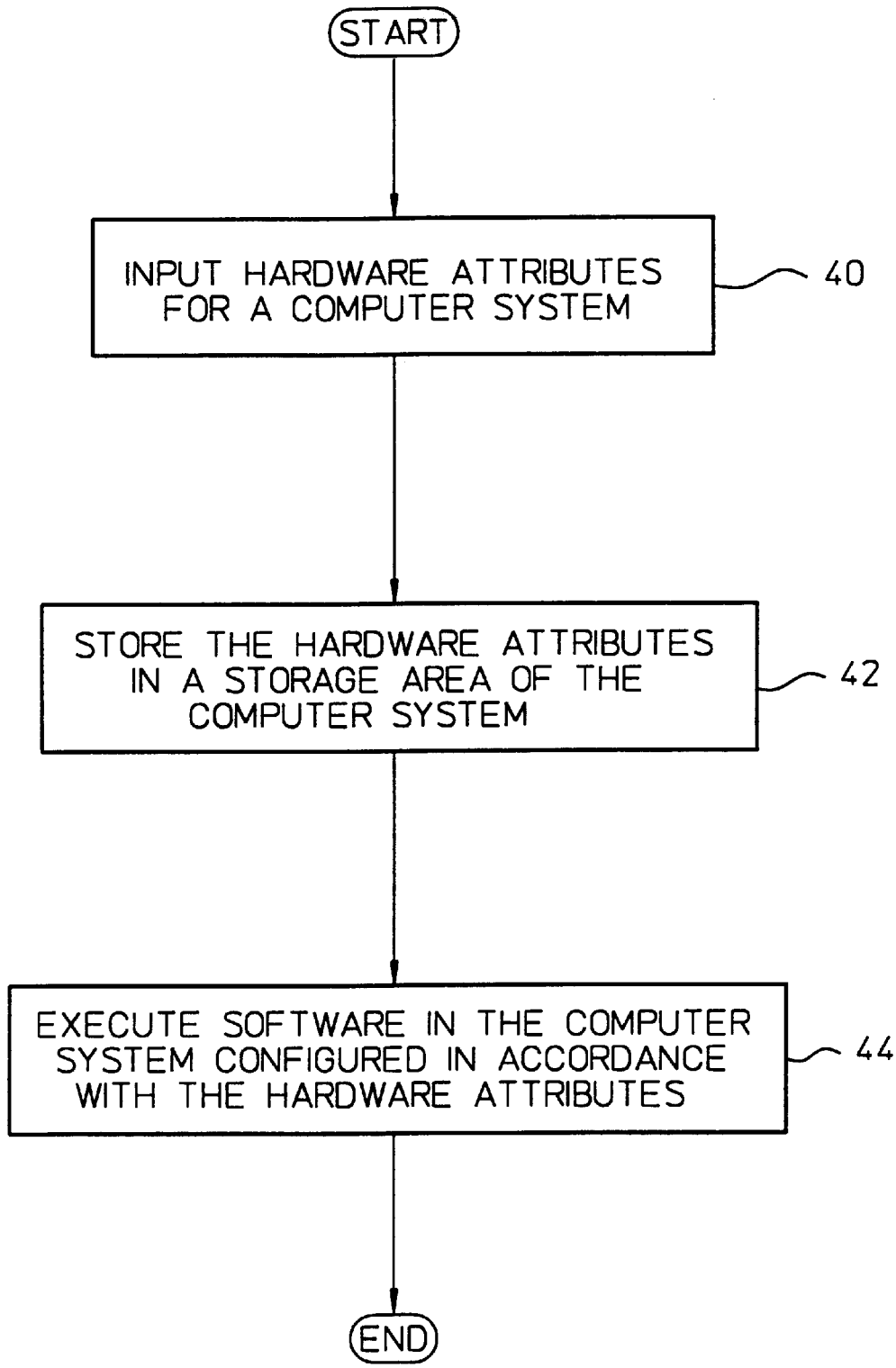
FIG. 4 is a flow chart illustrating a second embodiment of the invention.

FIG. 4 is a flow chart illustrating a second embodiment of the invention. In this embodiment, a user inputs 40 desired hardware attributes of a computer system. The hardware attributes input 40 by the user are then stored 42 in a storage area of a computer system. The computer system then executes 44 software as if it had the desired hardware attributes.

Software developers would utilize the second embodiment of the invention to perform studies concerning the effects hardware resources play in the execution speed of various software programs or algorithms. Of course, the computer system would have to configure itself so as to only provide the hardware resources which the user has input 40. In so doing, it is a natural limitation that the user cannot input 40 hardware attributes which exceed those of the computer system. Preferably, the method according to the second embodiment may also optimize a portion of the code of the software as in the first embodiment, prior to executing the code being optimized.

Figure 5:
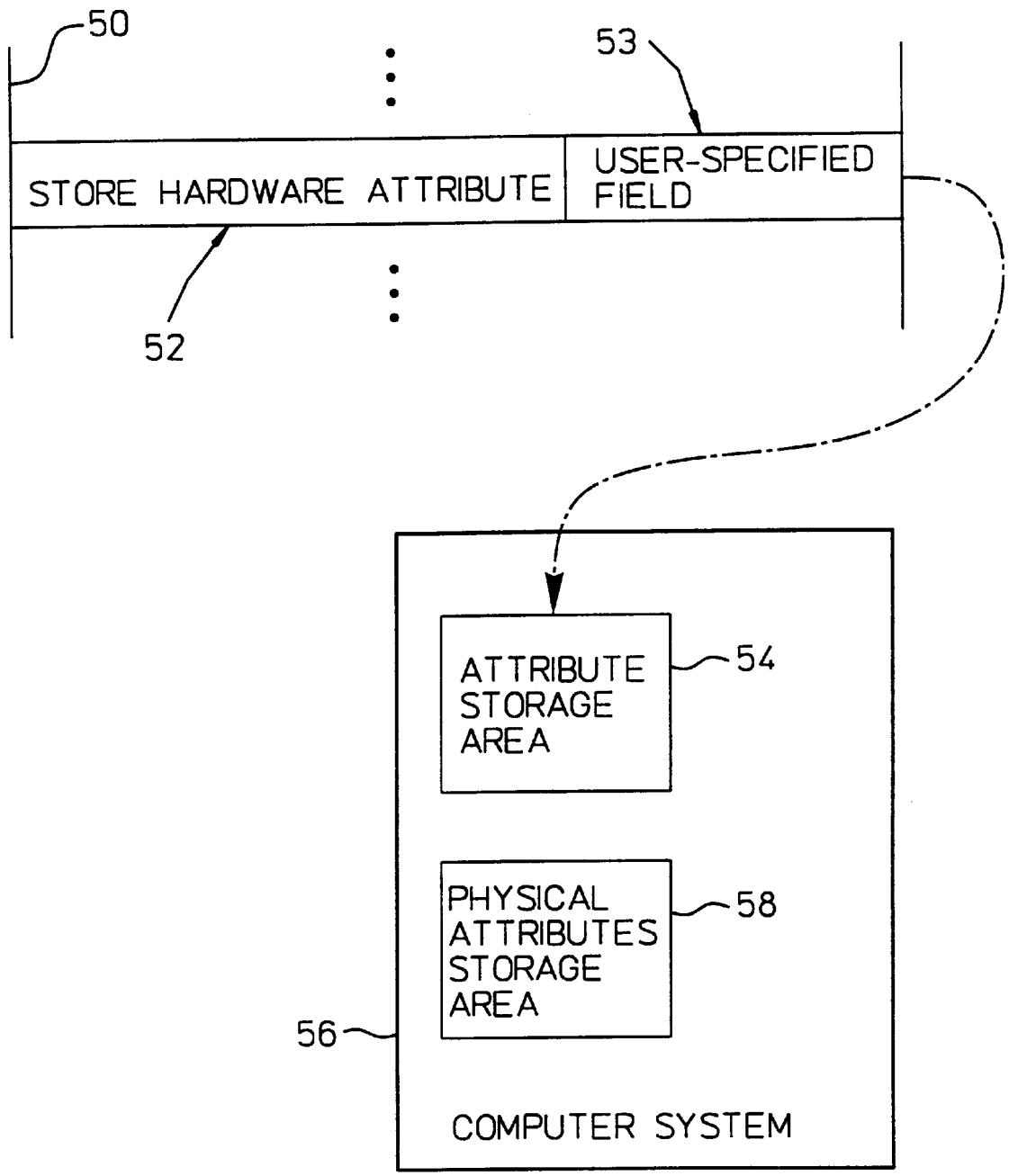
FIG. 5 is a diagram illustrating an example of the interaction between a computer program and a computer system to store a hardware attribute in the computer system according to the second embodiment of the invention.

FIG. 5 is a diagram illustrating an example of the interaction between a program and a computer system to store a hardware attribute in a computer system according to a second embodiment of the invention. As an example, a program 50 includes a Store Hardware Attribute Instruction 52 which contains a user-specified field 53. The user-specified field 53 contains or points to the hardware attribute input by the user. When the Store Hardware Attribute Instruction 52 is executed, it stores the hardware attribute input by the user to an attribute storage area 54 contained within a computer system 56. Thereafter, the computer system 56 configures its hardware resources in accordance with the desired hardware attribute stored in the storage area 54. The computer system 56 should also check the desired hardware attribute against the physical attributes of the computer system 56 stored in a physical attributes storage area 58 so that only legal values are stored. For example, if a computer system has a 256 kilobyte cache and a user inputs a hardware attribute requesting a 100 kilobyte cache, although the cache size requested is less than the size of cache available in the computer system, the desired hardware attribute (e.g., 100 kilobyte) would be illegal because it is not a power of two.

Moreover, the hardware attributes of the computer system can be made accessible to the software by a number of different approaches. A first approach is to use a hardware set register which is set at power-on time to contain the hardware attributes. The attributes can be self-determined by the computer or loaded into the computer via a keyboard. A second approach is to provide the hardware attributes of the computer within a portion of a read-only memory (e.g., ROM or EPROM). A third approach would be to provide a register which would store the appropriate hardware attributes upon booting-up the operating system of the computer. A fourth approach would be to dedicate a control register to the attributes. The advantage of using a control register is that the user can state the hardware attributes to be used which is important if the second embodiment of the invention is to be used. A fifth approach is to dedicate a section of memory for the purpose of storing hardware attributes. Like the fourth approach, this approach also allows the user to state specific hardware attributes to be utilized by the computer system.

Further, depending upon the hardware attributes needed by the software to perform the optimization, the software program includes various hardware query instructions. In general, these query instructions can load any specific hardware attribute of the computer system. As examples, the following query instructions may be useful to optimize the code performance of the software:

Load Cache Size for Level 1 Data Cache
Load Cache Line Size for Level 1 Data Cache
Load Cache Associativity for Level 1 Data Cache
Load Replacement Algorithm for Level 1 Data Cache
Load Write Through vs Write Back for Level 1 Data Cache
Load Cache Size for Level 2 Data Cache
Load Cache Line Size for Level 2 Data Cache
Load Cache Associativity for Level 2 Data Cache
Load Replacement Algorithm for Level 2 Data Cache
Load Write Through vs Write Back for Level 2 Data Cache
Load Mechanism for cache consistency (for multiprocessors)
Load Number of Data Translation Look-aside Buffer (DTLB) Entries
Load DTLB Associativity
Load DTLB Page Size of page containing specified address
Load Main Memory Interleave Factor
Load Main Memory Size
Load Main Memory Bank Busy Time
Load Number of Integer Registers
Load Number of Floating Point Registers
Load Number of General Purpose Registers
Load Number of Vector Integer Registers
Load Number of Vector Floating Point Registers
Load Number of Vector General Purpose Registers
Load Processor Cycle Time
Load Number of Functional Units
Load Floating Point Availability Likewise, in the second embodiment of the invention, the software program includes various store instructions depending upon the hardware attributes to be controlled. In general, these store instructions can load any specific hardware attribute of the computer system. For example, for every query instruction listed above, a corresponding store instruction is available.

Although the invention has been generally described as optimizing code or specific algorithms within a software program in accordance with computer resources, the invention has many applications. A few of the many applications have been discussed above, namely, matrix multiplication, various library functions, compilers, database programs and operating systems. Of course, the software program being optimized may be of any type, structure or language.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of configuring hardware attributes for a general purpose computer system having predetermined hardware resources, comprising the steps of:

(a) inputting via a first software program desired hardware attributes for the computer system, the desired hardware attributes cannot exceed the predetermined hardware resources;

(b) storing, by the first software program, the desired hardware attributes input in step (a) to a first storage area of the computer system; and (c) executing at least a portion of a second software program in the computer system configured in accordance with the desired hardware attributes.

2. A method as recited in claim 1, wherein said storing step (b) comprises the step of executing a store hardware attribute instruction within the first software program to store the desired hardware attributes to the first storage area.

3. A method as recited in claim 1, wherein said executing step (c) comprises the step of optimizing at least a portion of code within the second software program based the desired hardware attributes.

4. A method as recited in claim 1, wherein said method further comprises the step of (d) determining, prior to step (b), whether the desired hardware attributes input in step (a) exceed physical attributes of the computer system, the physical attributes being stored in a second storage area of the computer system, and wherein said storing step (b) is dependent upon said determining step (d).

5. A computer system, comprising:

a general purpose computer having predetermined hardware resources;

a program-accessible storage area storing at least one hardware attribute corresponding to hardware resources desired for said computer, the desired hardware resources cannot exceed the predetermined hardware resources; and emulation means for using said computer as if said computer has the hardware resources desired in accordance with the at least one hardware attribute stored in said program-accessible storage area.

6. A computer system as recited in claim 5, wherein said emulation means uses the at least one hardware attribute stored in said program-accessible storage area to restrict use of at least a portion of the predetermined hardware resources of said computer.

7. A computer system as recited in claim 5, wherein said system further comprises means for determining if the at least one hardware attribute is an allowed value for the hardware resources of said computer.

8. A computer system as recited in claim 5, wherein said system further comprises:

a computer program for execution by said computer, said computer program including at least one store hardware attribute instruction which stores the at least one hardware attribute corresponding to the hardware resources desired to said program-accessible storage area; and an optimization unit for optimizing execution of at least a portion of said computer program remaining in accordance with the hardware attributes.

\* \* \* \* \*